Oct. 20, 1925.

1,557,651

J. J. BUSS

SEEDER AND DRILL ATTACHMENT

Filed Sept. 17, 1923

INVENTOR:
Joseph J. Buss,
BY A.M. Carlsen.
ATTORNEY.

Patented Oct. 20, 1925.

1,557,651

UNITED STATES PATENT OFFICE.

JOSEPH J. BUSS, OF PRESCOTT, WISCONSIN.

SEEDER AND DRILL ATTACHMENT.

Application filed September 17, 1923. Serial No. 663,141.

*To all whom it may concern:*

Be it known that I, JOSEPH J. BUSS, a citizen of the United States, residing at Prescott, in the county of Pierce and State of Wisconsin, have invented certain new and useful Improvements in Seeder and Drill Attachments, of which the following is a specification.

My invention relates to attachments for seeding machines, and the object is to provide a highly efficient soil pulverizing attachment upon the front part of a seeder or drill, forward of the seed hopper, and means for throwing said attachment any desired depth into the soil and clear out of it when so desired, and by so doing save at least one of the successive operations heretofore necessary in plowing, harrowing, seeding and dragging a field.

Figures 1, 2, 3:
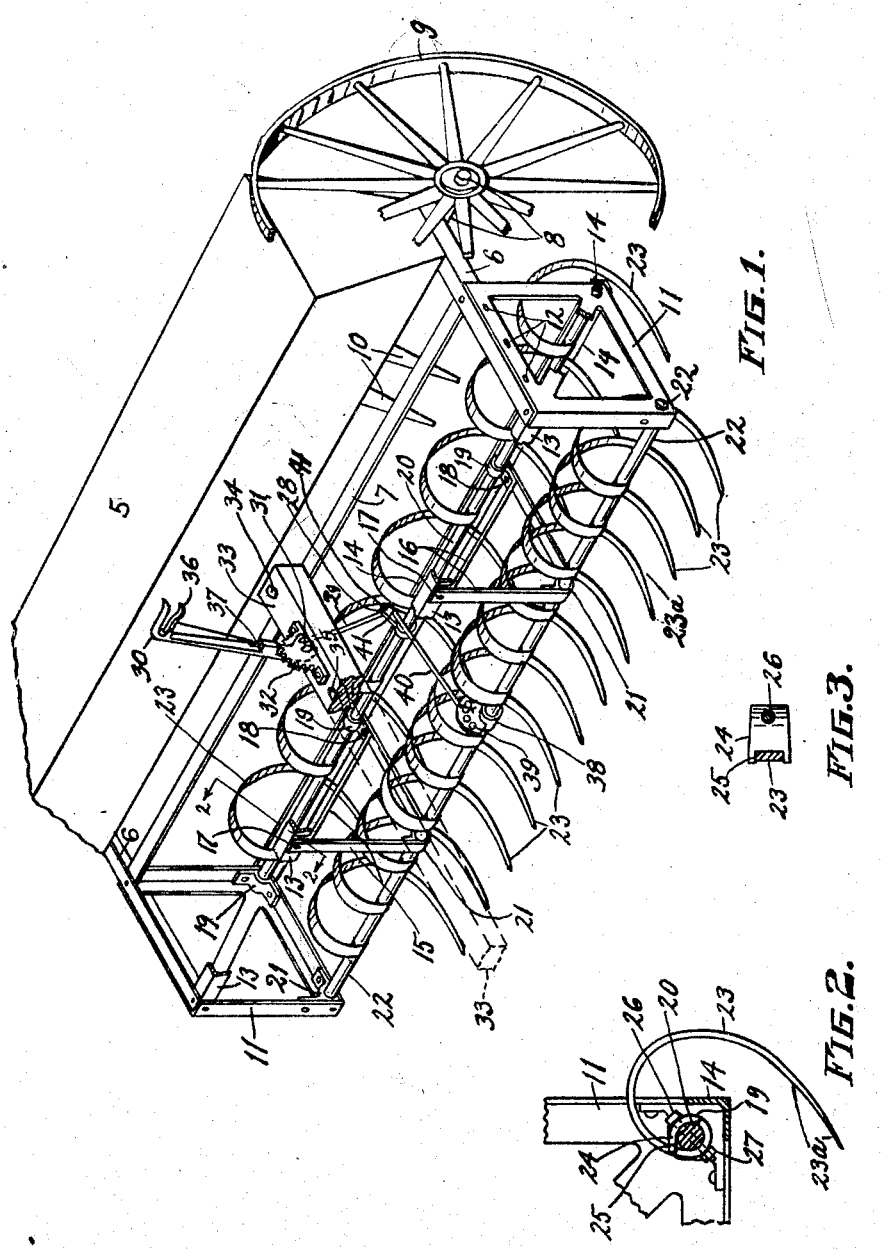
Fig. 1 is an isometric view of a seeding machine provided with my attachment.
Fig. 2 is a sectional detail view on the line 2—2 of Fig. 1 showing mainly one of the pulverizing teeth employed.
Fig. 3 is a top view of the clamp member 24 in Fig. 2.

Referring to the drawing by reference numerals, 5 designates the seed hopper of the machine which is secured upon a frame 6—7 carried by an axle 8 and two ground wheels 9 of which only one is shown in mutilated condition, the other being omitted because such supporting wheels are well known in seeders and drills. Likewise it is well known that seed hoppers have seed dropping tubes 10, of suitable shape for either broadcast seeding or drilling in rows and internal seed delivering means operated from one of the ground wheels. I therefore do not show those old mechanisms but only the new means for preparing the soil for seeding.

Said means comprise a suitable frame extending forward of the hopper. In the present drawing said frame consists of the frame arms 6, which support the hopper, the transverse angle bar 7 and two angular frames 11 secured at 12, one to each arm 6, a transverse angle-bar 13 between the upper front corners of the frames 11, and a transverse angle bar 14 between the lower rear corners of the frames 11. Triangular bracing frame members 15, 16 are also secured at 17 and 18 to said bars 13 and 14. The frame thus formed has bearings 19 for a rear shaft 20, and bearings 21 for a front shaft 22.

Each of the shafts has secured upon it a series of flat, curved spring teeth 23 of the C-shaped form shown. The upper part of such tooth is more sharply curved than the lower part and is secured to the shaft by a curved clamp 24 fitting one side of the shaft (see Fig. 2) and having its end broadened and formed with a notch 25 fitting over the tooth (see Fig. 3), and a bolt 26 passed through holes in the cap and the tooth and through a diametral aperture in the shaft and given a nut 27 the tightening of which secures the tooth firmly on the shaft. The other end of the tooth forms flat, pointed portion 23$^a$ which when in use moves almost endwise horizontally through the soil while it and the tooth portion in rear thereof break up and pulverize the soil and what the front teeth have thus done is further completed by the teeth of the rear shaft, which may be fewer than those on the front shaft and only where special kinds of soil and other conditions require it their numbers may be increased, or the numbers of the front teeth decreased.

On the rear shaft is fixed a rocker arm 28 operated by a rod 29 and an L-shaped hand lever 30, fulcrumed at 31 to a toothed sector 32 fixed upon the draft pole 33 of the machine. Said pole is fixed upon the frame by bolts 34—35. The lever 30 has a finger lever 36 operating a dog 37 engaging in the toothed or notched sector 32. Fixed on the front shaft 22 is a flat rocker-arm 38 having a segmental row of holes 39 either of which may be engaged by the angular front end of a rod 40, which has its rear end pivoted at 41 in the rocker arm 28. Hence the rod 40 does not only enable the lever 30 to rock both shafts in unison for bringing the teeth into and out of engagement with the soil, but by changing the rod from one hole to another in the arm 38, the front and rear teeth will engage at various depths in the soil which is desirable under various conditions.

In the operation of the machine the lever 30 is tilted forward and thereby the teeth backward until they fully clear the ground during idle driving of the machine. Coming then to a field that has been plowed, and in some cases also dragged, but for ordinary soil only plowed, the operator lowers the teeth into the soil and drives forward pulverizing the soil and at the same time seeds it from the seed hopper 5. After such operation the field may be cross dragged to cover the seed, where the seed is of a kind not sufficiently covered by its fall into the pulverized soil. If the seeding machine is of the drilling type having its own furrow openers and closers, or at least furrow openers it makes no difference as to the fact that this improved machine saves the operation of dragging preparatory to seeding, and a further advantage is that if the teeth hit stones or rocks they are limber enough to yield and pass over the obstruction and resume their normal form or position.

What I claim is:

In a machine of the class described, a rock shaft having a series of spaced diametral bolt holes, a series of C-shaped pulverizing teeth each of which has its upper end formed with a loop fitting about the shaft and provided with two holes registering with the ends of one of the holes in the shaft, and a bolt passed through said registering holes and provided with a nut the short end of said looped portion of the tooth being broadened and formed with two projections which straddle the body of the tooth near the loop.

In testimony whereof I affix my signature.

JOSEPH J. BUSS.